United States Patent [19]

Keller

[11] Patent Number: 5,003,039

[45] Date of Patent: Mar. 26, 1991

[54] AMINO PHENYL CONTAINING CURING AGENT FOR HIGH PERFORMANCE PHTHALONITRILE RESIN

[75] Inventor: Teddy M. Keller, Alexandria, Va.

[73] Assignee: The United States of America as represented by the Secretary of the Navy, Washington, D.C.

[21] Appl. No.: 273,443

[22] Filed: Nov. 18, 1988

[51] Int. Cl.$^5$ ............................................. C08G 83/00
[52] U.S. Cl. .................................. 528/362; 524/600;
528/125; 528/128; 528/172; 528/173; 528/183;
528/185; 528/186; 528/188; 528/206; 528/207;
528/208; 528/210; 528/211; 528/220; 528/229;
528/335; 528/347; 528/348; 528/353; 564/430;
564/463
[58] Field of Search ............... 528/362, 183, 172, 173,
528/206, 208, 207, 210, 211, 335, 348, 347, 353,
185, 188, 125, 220, 186, 191, 128, 229; 524/600

[56] References Cited

U.S. PATENT DOCUMENTS

| 3,956,320 | 5/1976  | Heath et al.    | 260/346.3 |
| 4,223,123 | 9/1980  | Keller et al.   | 528/210   |
| 4,226,801 | 10/1980 | Keller et al.   | 260/465   |
| 4,234,712 | 11/1980 | Keller et al.   | 528/9     |
| 4,238,601 | 12/1980 | Keller et al.   | 528/206   |
| 4,259,471 | 3/1981  | Keller et al.   | 528/9     |
| 4,408,035 | 10/1983 | Keller          | 528/183   |
| 4,410,676 | 10/1983 | Keller          | 528/9     |
| 4,480,082 | 10/1984 | McLean et al.   | 528/103   |
| 4,587,325 | 5/1986  | Keller          | 528/172   |
| 4,619,986 | 10/1986 | Keller          | 528/99    |
| 4,725,564 | 2/1988  | Gannett et al.  | 524/600   |
| 4,739,028 | 4/1988  | McLean et al.   | 528/103   |
| 4,786,668 | 11/1988 | Dewhirst        | 523/445   |

OTHER PUBLICATIONS

Fluorinated High Temperature Phthronitrile Resin, Keller, Polymer Communications, vol. 28, p. 337 (Dec. 1987).

Primary Examiner—Harold D. Anderson
Attorney, Agent, or Firm—Thomas E. McDonnell; Barry A. Edelberg

[57] ABSTRACT

High temperature polymeric materials, which are easily process into void-free components, are needed for use in composites for advanced aerospace applications. These materials could bridge the gap between currently-used polymeric materials and ceramics or metal. Phthalonitrile resins can be used as high temperature polymeric material and 1,3-bis(3-aminophenoxy)benzene can be used as a curing agent to reduce voids and benzene can be used as a curing agent to reduce voids and blisters formed from volatiles during polymerization.

28 Claims, No Drawings

AMINO PHENYL CONTAINING CURING AGENT FOR HIGH PERFORMANCE PHTHALONITRILE RESIN

BACKGROUND OF THE INVENTION

1. FIELD OF THE INVENTION

This invention relates to the synthesis of phthalonitrile resins and, more specifically, to 1,3-bis(3-aminophenoxy)benzene used as a curing agent for a rapid synthesis of phthalonitrile resins and a method thereof.

2. DESCRIPTION OF THE PRIOR ART

Interest in fiber-reinforced composites for advanced aerospace applications has led to the search for high temperature polymers that are easily processed and exhibit high thermal and oxidative stability. Epoxies and polyimides are now being used but each has its disadvantages. Conventional epoxy-based composites and adhesives have a 200° C. maximum service limit and polyimide resins used in composites matrices have a 300° C. maximum service limit. Advanced design concepts, especially in the aerospace industry, demand even higher temperature requirements for polymeric materials.

A major problem of the polyimide system is the inability to process void- and blister-free components in high yield because of the evolution of volatile components formed during the polymerization condensation reaction. Other problems associated with both polyimides and epoxies include their brittleness, water absorptivity and engineering reliability.

Phthalonitrile resins, such as diether-linked phthalonitrile resins, are proving to be superior in physical and chemical properties to epoxies, polyimides and other plastics as matrices for fiber-reinforced composites. A major advantage of phthalonitrile resins, compared to other plastics, is their ability to withstand temperatures in excess of 300° C. for extended periods without permanent damage to the coatings, plastics or composites made therefrom. Such resins usually contain a substantial proportion of aromatic structures, but cured polymers composed solely of aromatic rings tend to be brittle and intractable. A resin having flexible linkages between the aromatic rings minimizes or greatly reduces brittleness and intractability. Polyphthalocyanines with diether linkages are materials which meet these goals. Examples of these polyphthalocyanines are found in U.S. Pat. Nos. 4,223,123; 4,226,801; 4,234,712; and 4,238,601 issued to T. M. Keller and J. R. Griffith. However, polymerization and cure of these monomers in the neat state generally requires heating for several days at extremely high temperatures.

U.S. Pat. No. 4,408,035 teaches curing of phthalonitrile monomers with a nucleophilic aromatic amine. The monomer, 4,4'-bis(3,4-dicyanophenoxy)biphenyl, has a melting point of 232°-234° C. The aromatic diamines covered in the above patent are somewhat volatile at the required processing melt temperature, causing void problems when used in an amount greater than 5% by weight. It is advantageous for a resin not to produce gaseous products when cured. Also, the chemical makeup of the polymer must be such that it consists of units having known resistance to bond-rupture under thermal, oxidative and hydrolytic conditions.

SUMMARY OF THE INVENTION

It is an object of this invention to reduce the cure time for polymerization of bisphenol-linked phthalonitrile monomers.

And, it is an object of this invention to polymerize diether-linked diphthalonitrile monomers at a temperature lower than the monomer's melting point.

In addition, it is an object of this invention to produce a polymeric material which is free of voids.

Further, it is an object of this invention to produce materials for composite matrices to be used in applications where the operating temperature is above the operating temperature for conventional high temperature polymers and below the operating temperature for ceramics or metals.

Also, it is an object of this invention to produce a phthalonitrile resin which will be thermally and oxidatively stable and have good mechanical properties at temperatures in excess of 300° C.

These and other objects are accomplished by 1,3-bis(-3aminophenoxy)benzene and other bis(aminophenoxy) compounds used as a curing agent in the polymerization of a phthalonitrile monomer.

DETAILED DESCRIPTION OF THE INVENTION

The curing agents of this invention are amines of the following formula:

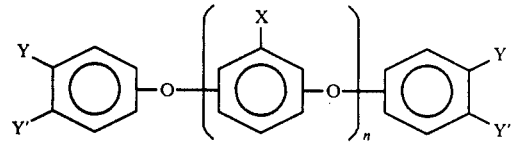

wherein n is 0, 1, 2, 3, 4 or 5; X is a hydrogen, a halogen, a halocarbon, an alkyl, an amino group or a amino group substituted with alkyls; Y is a hydrogen or an amino group; Y' is a hydrogen or an amino group and at least one Y or Y' must be an amino group. The preferred compound is where n is 1, 2 or 3, X is a hydrogen, chlorine, bromine, an alkyl of five carbons or less, an amino group or an amino group substituted with an alkyl of five carbon or less, Y is an amino group and Y' is an hydrogen. The most preferred compound is where n is 1, X is a hydrogen, Y is an amino group and Y' is a hydrogen, such as 1,3-bis(3-aminophenoxy)benzene.

Any phthalonitrile monomer capable of forming polymeric materials can be polymerized with the amines of this invention. These curing agents are especially useful for the polymerization of highly aromatic phthalonitrile monomers whose melting points are above 150° C. The advantages of this invention, e.g., improved polymerization rate, are best realized for diphthalonitrile monomers having no active hydrogen atoms, which are represented by the general formula below:

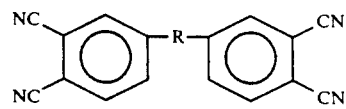

where R is a diethoxy radical, such as a bisphenoxy radical or a dithioethoxy radical.

These monomers, unlike those disclosed and claimed in U.S. Pat. No. 4,056,560 issued to Griffith et al., normally require several days of continuous heating at 260° C. to 290° C. when cured neat before a viscosity increase becomes evident, i.e., before reaching the B-stage of polymerization. Examples of these monomers are those in U.S. Pat. Nos. 3,730,946, 3,763,210; 3,787,475; 3,869,499 and 3,972,902 issued to D. R. Heath and J. G. Wirth.

The monomers above are all diether-linked, but monomers with other bridges and without active hydrogen atoms can be quickly polymerized by the addition of the amines of this invention. However, the importance of this invention is the rapid polymerization of diether-linked diphthalonitrile monomers because the ether linkages impart sufficient flexibility to the resin to make the resin an excellent composite resin.

Accordingly, the preferred diphthalonitrile monomers are those in which R in the formula above is a diether group, —O—R'—O. The most preferred diphthalonitrile monomers are those wherein R' is selected from the class consisting of —Ar—$C_3H_6$—Ar—, —Ar—$C_3F_6$—Ar—, —$C_aH_{2a}$—, —Ar—Ar—,

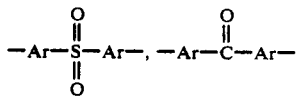

and —Ar— wherein Ar is a phenyl group, wherein the phenyl groups are linked at the para and the meta positions and wherein "a" is any integer.

It is possible with the present invention to include a metal or metal salt in the resins. For composite fabrication, a salt or a metal would be less desirable because of problems with homogeneity and gasing. Examples of suitable metal salts include cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/$SnCl_2$) and mixtures thereof. The metals which can used include chromium, molybdenum, vanadium, beryllium, silver, mercury, aluminum, tin, lead, antimony, calcium, barium, manganese, magnesium, zinc, copper, iron, cobalt, nickel, palladium and platinum. Mixtures of these metal may also be used. The preferred metals are copper, silver and iron.

The polymerization reaction can be performed by heating the monomer to a temperature in the range from above its melting point to about its decomposition temperature, mixing the curing agent in the amount of from about 1 to about 40 percent of total resin weight. The preferred heating is at a temperature in the range of from about 200° C. to about 250° C. The most preferred heating is at a temperature in the range from about 220° C. to about 240° C. The preferred amount of curing agent is from about 1 to about 10 per cent of total resin weight. The most preferred amount of curing agent is from about 1 to about 2 per cent.

The monomer-curing agent mixture is further heated above its melting point or glass transition temperature ($T_g$) until gelation occurs, followed by an additional heat treatment until the mixture becomes solid and has lost its rubbery texture. One recommended curing cycle is at a temperature in the range from about 150° C. to about 265° C. for about 4 to 18 hours, followed by a temperature in the range from about 250° C. to about 300° C. for about 4 to 8 hours and followed by a temperature in the range from about 300° C. to about 315° C. for about 10 to 18 hours. The preferred curing cycle is at a temperature in the rang from about 240° C. to about 250° C. for about 16 hours, followed by a temperature in the range from about 270° C. to about 290° C. for about 6 hours and followed by a temperature in the range from about 300° C. to about 315° C. for about 16 hours. The most preferred curing cycle is at a temperature of about 240° C. for about 16 hours, followed by a temperature of about 280° C. for about 6 hours and followed by a temperature of about 315° C. for about 16 hours. The curing is accomplished by any known means of curing polymeric material, such as an air-circulating oven. A subsequent postcuring at elevated temperatures improves the mechanical and thermal properties.

Alternatively, the monomer-curing agent mixture can be heated to any viscosity desired by a fabricator and quenched at a stage before gelation occurs. The resulting prepolymer can be stored indefinitely at room temperature without further reaction. When needed, the prepolymer can be processed above the glass transition temperature, which has been greatly suppressed relative to the original melting point of the monomer. The cure cycles would be the same as those recommended above. The stability of the prepolymer at ambient temperature is particularly appealing for the preparation of prepregs and their applications as laminates for fiber-reinforced composites.

This invention makes it possible to reduce the time and temperature needed for polymerization of bis-phenol-linked phthalonitrile monomers. Moreover, these new amine curing agents reduce the void problems found in phthalonitrile resins cured in the presence of high concentrations of other aromatic amines that are not completely stable at the initially required processing temperatures. In addition, polymeric compositions can be fabricated with consistent properties since these amine curing agents do not volatilize during the polymerization reaction.

The invention having been generally described, the following examples are given as particular embodiments of the invention to demonstrate its practice and advantages. It is understood that the examples are given by way of illustration and are not intended to limit the specification or the claims to follow in any manner.

EXAMPLE I 2,2-Bis[4-(3,4-dicyanophenoxy)phenyl]propane (1.0 g, 2.1 mmol) was placed in an aluminum planchet and melted on top of a hot plate preheated to 220° C. To the melt was added 1,3-bis(3-aminophenoxy) benzene (0.01 g, 0.034 mmol) with stirring. After 1 hour of heating, the sample was observed to have increased in viscosity. The sample was then placed in an oven preheated to 240° C. After heating for 15 hours overnight, the sample gelled. The sample was further heated at 280° C. for 6 hours and at 300° C. for 16 hours to enhance the physical properties.

EXAMPLE II

Using the method of Example I, 1,3-bis(3-aminophenoxy)benzene (0.02 g, 0.069 mmol) was added with stirring to the melt of 2,2-bis[4-(3,4-dicyanophenoxy)phenyl]propane. Gelation occurred after hours of heating. The sample was placed in an oven and heated consecutively at 240° C. for 15 hours, at 280° C. for 6 hours and at 300° C. for 16 hours, which resulted in the formation of a tough, void-free polymeric material.

EXAMPLE III

Using the method of Example I, 1,3-bis(3-aminophenoxy)benzene (0.05 g, 0.17 mmol) was added with stirring to achieve homogeneity to the melt of 2,2-bis[4-(3,4-dicyanophenoxy)phenyl]propane. Gelation occurred after 15 minutes. The sample was placed in an oven and heated at 240° C. for 16 hours, at 280° C. for 6 hours and at 300° C. for 16 hours. The resulting polymer appeared tough and was void-free.

EXAMPLE IV

Using the method of Example I, 1,3-bis(3-aminophenoxy)benzene (0.10 g, 0.34 mmol) was added with stirring to the melt of 2,2-bis[4-(3,4-dicyanophenoxy)phenyl]propane. Almost immediately, a rapid increase in viscosity was observed. After approximately 5 minutes, gelation occurred. To complete the cure, the sample was placed in an oven and heated at 240° C. for 16 hours, at 280° C. for 6 hours and at 300° C. for 16 hours. The resulting dark green polymer appeared tough and exhibited good thermal properties.

EXAMPLE V

Using the method of Example I, 1,3-bis(3-aminophenoxy)benzene (0.01 g, 0.034 mmol) was added with stirring to the melt of 4,4'-bis(3,4-dicyanophenoxy)biphenyl (1.0 g 2.28 mmol) at 240° C. After 1 hour of heating at 240° C., the melt had increased slightly in viscosity. The sample was placed in an oven preheated to 240° C. and heated in air for 16 hours. Gelation occurred sometime during this heat treatment. There was further curing at 280° C. for 6 hours and at 315° C. for 16 hours. The resulting polymer was postcured at various temperatures up to 400° C. and various annealing times to optimize physical properties. When exposed to temperatures in excess of 315° C., the polymer was postcured under an inert atmosphere.

EXAMPLE VI

Using the method of Example V, 1,3-bis(3-aminophenoxy)benzene (0.015 g, 0.051 mmol) was added with stirring to the melt of 4,4'-bis(3,4-dicyanophenoxy)biphenyl. After approximately 30 minutes, the mixture had become fairly viscous. The dark mixture was then placed in an oven and heated in air at 240° C. for 16 hours. The mixture solidified during this heat treatment. To complete the cure, the mixture was heated at 280° C. for 6 hours and at 315° C. for 16 hours. Further postcuring of the polymer under an argon atmosphere under various annealing times and at temperatures up to 400° C. enhanced specific physical properties.

EXAMPLE VII

Using the method of Example V, 1,3-bis(3-aminophenoxy)benzene (0.02 g, 0.064 mmol) was added with stirring to the melt of 4,4'bis(3,4-dicyanophenoxy)biphenyl. After 1 hour of heating, the mixture had been transformed into a rubbery composition indicating gelation had occurred. To complete the cure, the sample was heated at 240° C. for 16 hours, at 280° C. for 6 hours and at 315° C. for 16 hours. Further postcuring of the polymer under an argon atmosphere at various temperatures up to 400° C. and at various annealing times enhanced specific physical properties.

EXAMPLE VIII

Using the method of Example V, 1,3-bis(3-aminophenoxy)benzene (0.050 g, 0.17 mmol) was added with stirring to the melt of 4,4'-bis(3,4-dicyanophenoxy)biphenyl. After approximately 10 minutes, the mixture had gelled. To complete the cure, the mixture was heated at 240° C. for 16 hours, at 280° C. for 6 hours and at 315° C. for 16 hours. The polymer was further postcured under an argon atmosphere at temperatures up to 400° C. to improve certain physical properties.

EXAMPLE IX

Using the method of Example V, 1,3-bis(3-aminophenoxy)benzene (0.10 g, 0.34 mmol) was added with stirring to the melt of 4,4'- bis(3,4-dicyanophenoxy)biphenyl. An increase in viscosity was observed almost immediately. Gelation occurred after 10 minutes. To complete the cure, the sample was heated in air at 240° C. for 16 hours, at 280° C. for 6 hours and at 315° C. for 16 hours. To improve on certain properties, especially the thermal stability, the polymer was postcured under an argon atmosphere under various annealing times and at temperatures up to 400° C.

EXAMPLE X

Using the method of Example I, 1,3-bis(3-aminophenoxy)benzene (0.015 g, 0.051 mmol) was added with stirring at 240° C. to the melt of 2,2-bis[4-(3,4-dicyanophenoxy)phenyl]hexafluoropropane (1.0 g, 1.81 mmol). After heating for 1 hour, the mixture became fairly viscous. Conversion to the rubbery state occurred after 2 hours of heating. The sample was then placed in an oven to complete the cure and was heated in air at 240° C. for 16 hours (overnight), at 280° C. for 6 hours and at 315° C. for 16 hours. The polymer was postcured under an argon atmosphere at elevated temperatures up to 400° C. to enhance the thermal properties.

EXAMPLE XI

Using the method of Example X, 1,3-bis(3-aminophenoxy)benzene (0.02 g, 0.064 mmol) was added with stirring to the melt of 2,2-bis[4-(3,4-dicyanophenoxy)phenyl] hexafluoropropane (1.0 g, 1.81 mmol). After 1 hour of heating at 240° C., the sample was extremely viscous. The sample was then cured by heating in air at 250° C. for 16 hours, at 280° C. for 6 hours and at 315° C. for 16 hours. The thermal and mechanical properties were enhanced by postcuring at elevated temperatures under an argon atmosphere.

This invention significantly lowers the cure time and temperature for polymerization of phthalonitrile monomers. The resulting resin is useful as a high temperature matrix material for aerospace applications or as a molding material for fabrication of electronic devices. The reduction of volatiles during polymerization improves processability of the resin.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A phthalonitrile resin reaction product of a curing agent of the following formula:

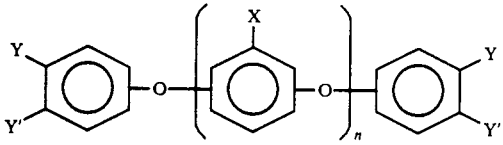

wherein n is 1, 2, 3, 4 or 5; X is a hydrogen, a halogen, a halocarbon, an alkyl, an amino group or a amino group substituted with alkyls; Y is a hydrogen or an amino group; Y' is a hydrogen or an amino group and at least one Y or Y' must be an amino group, and a phthalonitrile monomer wherein the curing agent is from about 1 to about 40 percent of total resin weight.

2. A resin as recited in claim 1 wherein the phthalonitrile monomer is a highly aromatic phthalonitrile monomer with a melting point about 150° C.

3. A resin as recited in claim 2 wherein the highly aromatic phthalonitrile monomer is a diphthalonitrile monomer having no active hydrogen atoms.

4. A resin as recited in claim 3 wherein the diphthalonitrile monomer is of the general formula:

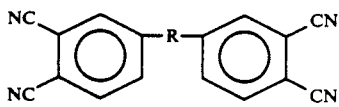

wherein R is chosen from the group consisting of a bisphenol group, a diethoxy radical and a dithioethoxy radical.

5. A resin as recited in claim 1 wherein the phthalonitrile resins contain an additive from the group consisting of a metal, a metal salt and mixtures thereof.

6. A resin as recited in claim 5 wherein the metal salt is chosen from the group consisting of cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride and mixtures thereof.

7. A resin as recited in claim 5 wherein the metal is chosen from the group consisting of chromium, molybdenum, vanadium, beryllium, silver, mercury, aluminum, tin, lead, antimony, calcium, barium, manganese, magnesium, zinc, copper, iron, cobalt, nickel, palladium, platinum and mixtures thereof.

8. A resin as recited in claim 7 wherein the metal is chosen from the group consisting of copper, silver and iron.

9. A resin as recited in claim 8 wherein the reaction product is a resin.

10. A resin as recited in claim 8 wherein the reaction product is a prepolymer.

11. A resin as recited in claim 4 wherein R is a diether group of the general formula —O—R'—O— wherein R' is selected from the class consisting of —Ar—C$_3$-

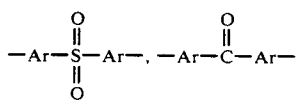

and —Ar— wherein Ar is a phenylene group, wherein the phenyl groups are linked at the para and the meta positions and wherein "a" is an integer.

12. A method of preparing a phthalonitrile resin comprising:
   a. heating a phthalonitrile monomer to a temperature in the range of the melting point of the phthalonitrile monomer to about the decomposition temperature of the resulting resin; and
   b. admixing as curing agent 1,3-bis(3-aminophenoxy)benzene in an amount from about 1 to about 40 percent of total resin weight with a diphthalonitrile monomer.

13. A method of preparing a phthalonitrile resin as recited in claim 12 wherein the heating is at a temperature in the range from about 200° C. to about 250° C.

14. A method of preparing a phthalonitrile resin as recited in claim 13 wherein the heating is at a temperature in the range from about 220° C. to about 240° C.

15. A method of preparing a phthalonitrile resin as recited in claim 14 wherein the curing agent is admixed in an amount from about 1 to 10 per cent of total resin weight.

16. A method of preparing a phthalonitrile resin as recited in claim 15 wherein the curing agent is admixed in an amount of from about 1 to about 2 per cent of total resin weight.

17. A method of preparing a phthalonitrile resin as recited in claim 12 wherein the mixture is heated after admixing the curing agent until gelation occurs.

18. A method of preparing a phthalonitrile resin as recited in claim 17 wherein after heating the mixture is subsequently cured until it becomes solid and loses its rubbery texture.

19. A method of preparing a phthalonitrile resin as recited in claim 18 wherein the curing is carried out in an air-circulating oven.

20. A method of preparing a phthalonitrile resin as recited in claim 19 wherein the curing is carried out from 150° C. to 265° C. for 4 to 18 hours, followed by 250° C. to 300° C. for 4 to 8 hours and followed by 300° C. to 315° C. for 10 to 18 hours.

21. A method of preparing a phthalonitrile resin as recited in claim 20 wherein the curing is carried out from 240° C. to 250° C. for 16 hours, followed by 270° C. to 290° C. for 6 hours and followed by 300° C. to 315° C. for 16 hours.

22. A method of preparing a phthalonitrile resin as recited in claim 21 wherein the curing is carried out from 240° C. for 16 hours, followed by 280° C. for 6 hours and followed by 300° C. for 16 hours.

23. A method of preparing a phthalonitrile resin as recited in claim 22 wherein the mixture is postcured to enhance physical properties.

24. A method of preparing a phthalonitrile resin as recited in claim 12 wherein the reaction is quenched before gelation occurs to form a prepolymer.

25. A method of preparing a phthalonitrile resin as recited in claim 24 wherein the prepolymer is stored at room temperature and further processed later by heating above the glass transition temperature.

26. A method of preparing a phthalonitrile resin as recited in claim 25 wherein the heating is in the range of temperature from about 150° C. to 265° C. for about 4 to 18 hours, followed by a temperature in the range from about 250° C. to 300° C. for about 4 to 8 hours and followed by a temperature in the range from about 300° C. to 315° C. for about 10 to 18 hours.

27. A method of preparing a phthalonitrile resin as recited in claim 26 wherein the heating is in the range of temperature from about 240° C. to 250° C. for about 16 hours, followed by a temperature in the range from about 270° C. to 290° C. for about 6 hours and followed by a temperature in the range from about 300° C. to 315° C. for about 16 hours.

28. A method of preparing a phthalonitrile resin as recited in claim 27 wherein the heating is in the range of temperature from about 240° C. for about 16 hours, followed by a temperature of about 280° C. for about 6 hours and followed by a temperature of about 300° C. for about 16 hours.

* * * * *